Dec. 18, 1962　　　　　L. PETERSEN　　　　　3,068,953
AUTOMOBILE SPEED CONTROL
Filed Aug. 12, 1959　　　　　　　　　　　　2 Sheets-Sheet 1
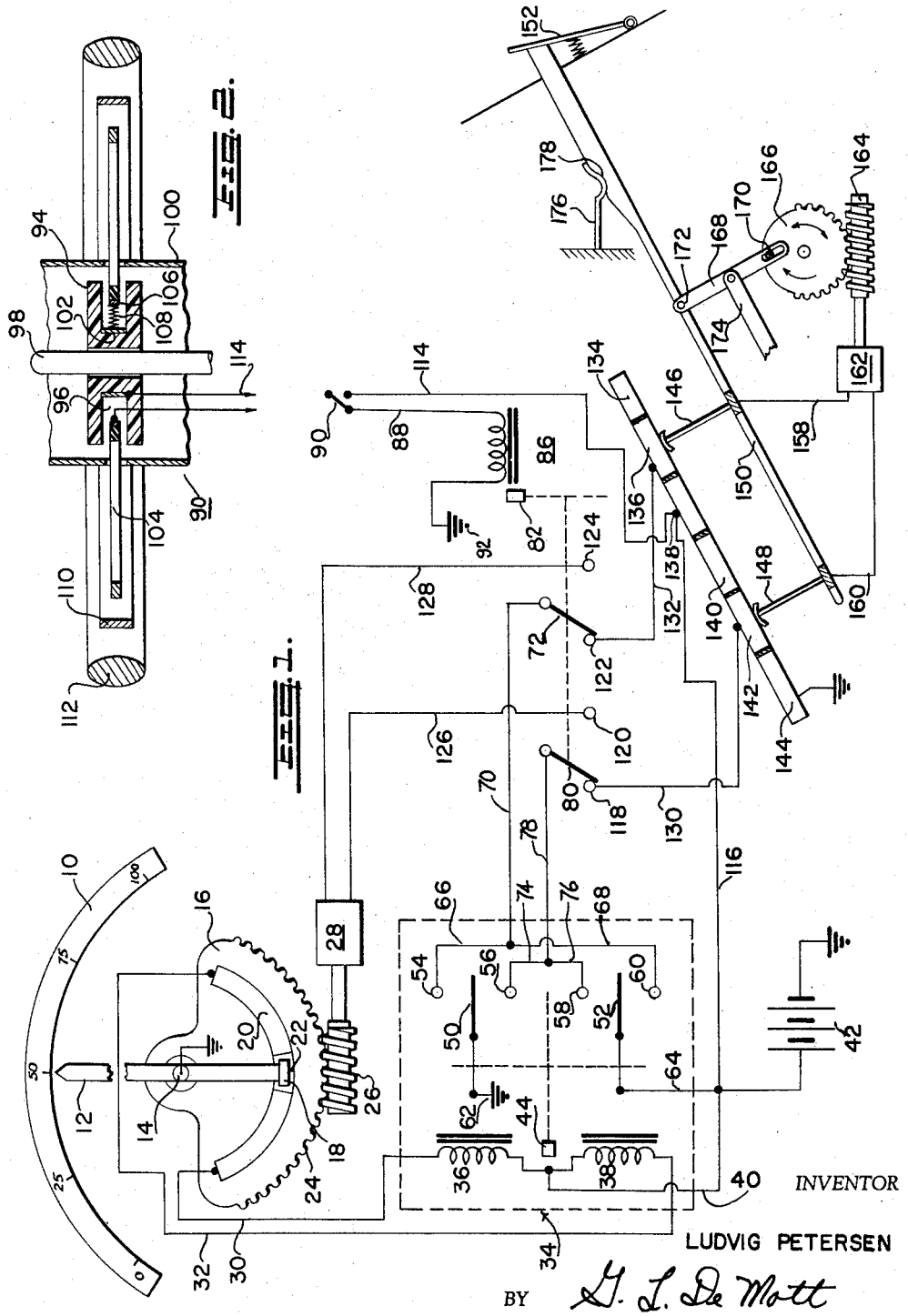
INVENTOR
LUDVIG PETERSEN
BY G. L. De Mott
ATTORNEY

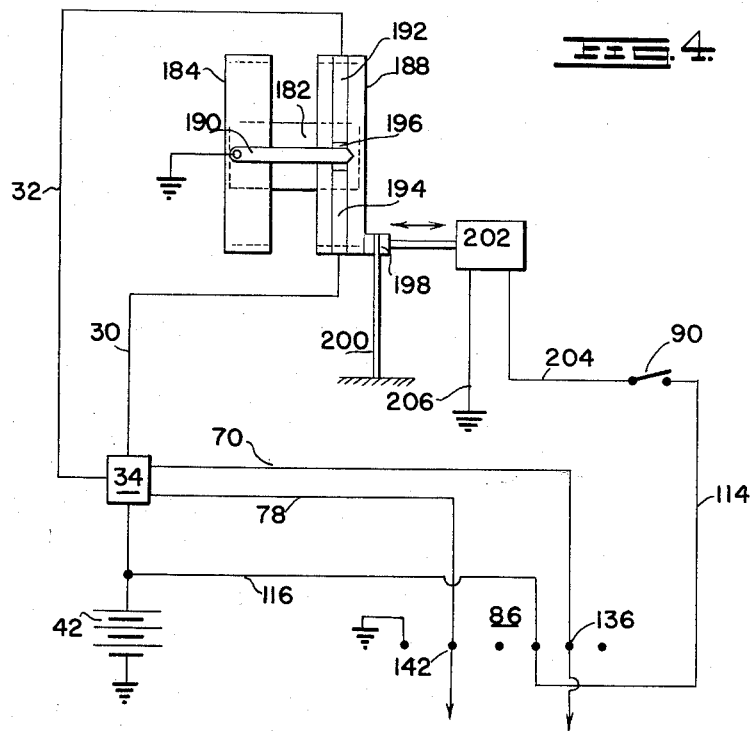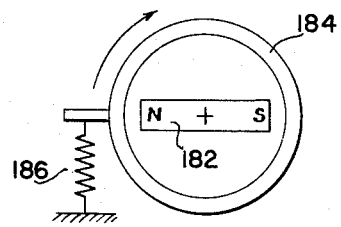

United States Patent Office 3,068,953
Patented Dec. 18, 1962

3,068,953
AUTOMOBILE SPEED CONTROL
Ludvig Petersen, Plainfield, Ill., assignor to General Motors Corporation, Detroit, Mich., a corporation of Delaware
Filed Aug. 12, 1959, Ser. No. 833,251
7 Claims. (Cl. 180—82.1)

This invention relates to vehicle speed control apparatus and more specifically to electrical controls for maintaining a predetermined vehicle speed.

It has been found to be desirable to provide an adjustable speed control for automobiles and other vehicles. The operator of a vehicle often prefers to maintain the exact allowable speed while driving on a road having a regulated speed limit. Present vehicle throttle controls require that the operator maintain a visual check of the speedometer to prevent excessive speed. Consequently, the speed of the vehicle usually varies two or three miles per hour above or below the desired speed and the operator is districted from maintaining a lookout on the road ahead.

An object of this invention is to provide throttle control means to maintain the speed of a vehicle at exactly the speed desired. Other objects are to provide a control mechanism for adjusting the controlled speed at the discretion of the vehicle operator; to provide means to increase or decrease the controlled speed to any position in a normal driving range; to provide means to make such adjustment quickly and without operator distraction; and to provide an adjustment control operable from a position adjacent the steering wheel whereby the vehicle operator is able to adjust the controlled speed without removing his hands from the steering wheel. A further object is to provide automatic throttle control apparatus which is subject to the overriding control of the vehicle operator at all times.

The apparatus is hereinafter described in detail with reference to the accompanying drawing in which:

FIGURE 1 is a schematic and diagrammatic view of the control apparatus,

FIGURE 2 is a detail vertical sectional view of the operator's adjustment control.

FIGURE 3 is a diagrammatic view of an alternative speed selector incorporated in my invention, and FIGURE 4 is an end view of the speedometer shown in FIGURE 3 and associated circuitry.

Referring now to FIGURE 1, a standard speedometer is provided with a scale 10 and a pointer 12. The pointer is pivoted as at 14 to a rotatable support disk 16. A contact member 18 is positioned on the lower end of the pointer 12 and is adapted to have sliding contact with a suitable contactor such as a silver plated copper half ring 20 mounted on the disk 16. The contact member is grounded as shown at the pivot 14. The half ring 20 is provided with a non-conducting portion 22 at its midpoint. The disk 16 is pivotally supported at 14 and provided with teeth 24 about its lower peripheral edge. A suitable drive mechanism such as a screw 26 is engaged with the teeth 24 and driven by a reversible motor 28.

The half ring 20 is electrically connected at its extremities by conductors 30, 32 to coils 36, 38 of a double acting or differential relay 34. The coils 36 and 38 are also electrically connected by conductor 40 to a battery 42. The armature 44 of the double acting relay 34 is controllably linked to movable contacts 50, 52. The movable contacts 50 and 52 are adapted to be cooperably and simultaneously associated with contacts 54 and 58 or 56 and 60, respectively. The movable contact 50 is grounded as at 62 and the movable contact 52 is connected by a conductor 64 to the battery 42. When the coils 36, 38 are deenergized, the movable contacts are biased to a neutral position as shown.

Contacts 54 and 60 are connected by conductors 66, 68, 70 to a movable contact 72 of a relay 86. The contacts 56 and 58 are connected by conductors 74, 76, 78 to a movable contact 80 of the relay 86. The movable contacts 72, 80 are controllably linked to the armature 82 of the relay 86. The relay 86 is electrically connected by a conductor 88 to a control switch 90 and is grounded as at 92.

Referring now to FIGURE 2, the control switch 90 comprises a non-conducting support ring 94 provided with an annular groove 96 and supported about a steering post 98 of a vehicle. A steering post housing 100 surrounds the switch assembly and the electrical wiring and connections may be made internally thereof. The inner surface of the groove 96 supports a contact member 102. An annular ring 104 carries a corresponding contact 106 on its inner periphery and is slidably supported within the groove 96. The ring 104 may be biased by suitable insulated compression springs 108 to maintain the switch 90 in an open position. A standard horn ring 110 and steering wheel 112 are shown mounted concentrically with the switch ring 104 and are connected within the steering wheel housing in the usual manner. The contact 102 is spaced from the contact 106 by the springs 108 a distance approximately equal to the space between the outer periphery of the switch ring 104 and the inner periphery of the horn ring 110. The contact member 102 is electrically connected by conductors 114, 116 to the battery 42 as shown in FIGURE 1.

Referring again to FIGURE 1, contacts 118, 120 and 122, 124 of the relay 86 are cooperably associated with the movable contacts 80 and 72, respectively. Contacts 120 and 124 are electrically connected by conductors 126 and 128 to the reversible electric motor 28.

The contacts 118 and 122 are electrically connected by conductors 130 and 132 to the contacts 142 and 136, respectively. The contact surfaces 136 and 142 represent the normal controlled-driving position of contactor engagement. The contact surfaces 138 and 144 provide a range of contact for contactor positions of acceleration beyond the normal controlled-driving position contacts 136 and 142, and the contact surfaces 134 and 140 provide a range of contact for contactor positions of deceleration below the normal controlled-driving position contacts. Other means of providing the aforementioned contact surfaces may be provided such as a ring contactor, cam or lost motion mechanism. A pair of slidable contactors 146, 148 are connected to an accelerator rod 150 which is controlled in the usual manner by a spring biased accelerator pedal 152. The contactors 146 and 148 are movable as a unit from the lower range contacts 134, 140 to the upper range contacts 138, 144.

The movable contactors 146, 148 are connected by conductors 158, 160 to a reversible electric motor 162. The motor 162 drives a screw member 164 which is drivingly associated with a rotatable wheel member 166. A link 168 is pivotally connected at one end 170 to the rotatable wheel 166 and is pivotally connected at the other end 172 to the accelerator rod 150. The link 168 pivotally supports and controls throttle linkage 174 in a manner whereby a throttle valve (not shown) may be opened or closed in response to movement of the accelerator rod 150 or wheel member 166. A spring 176 is adapted to be seated in an indentation 178 on the accelerator rod 150 during the normal controlled-driving position of engagement between the contact surfaces 136, 142 and the contactors 146, 148 as shown in FIGURE 1. The reversible motor 162 may be mounted concentrically about the accelerator rod 150 to conserve space and eliminate the linkage.

Referring now to FIGURE 3 and FIGURE 4, an alternative speed selector control is illustrated which may be substituted for the reversible electric motor 28 and the control relay 86 shown in FIGURE 1. In this embodiment a speed responsive magnet 182 is mounted within a rotatable metal cylinder 184. Cylinder 184 is biased against rotation by suitable spring means 186. The rotatable magnet 182 is also mounted within a second rotatable metallic cylinder 188 which is biased by spring means identical to the spring means 186, so that rotation of the magnet 182 will cause equal rotative displacement of the metal cylinders 184 and 188. A speed indicating arm 190 is secured to the metallic cylinder 184 and is adapted to have sliding engagement with the outer surface of the cylinder 188. Copper contact surfaces 192 and 194 are provided on the cylinder 188 and separated by a non-conducting portion 196. The copper contacts may be replaced by a slide wire and micro-positioner device. As shown in FIGURE 1, the copper contact surfaces are connected by conductors 30, 32 through a relay 34 to the battery 42. The relay 34 controls the accelerator linkage via the conductor 70, 78 and contacts 136, 142, as shown in FIGURE 1.

The second rotatable metallic cylinder 188 is provided with a brake shoe 198 rigidly attached to a spring arm 200, so that the brake shoe 198 will be in engagement with the metallic cylinder 188 in the unflexed position of the spring 200. A solenoid 202 is connected by the conductor 204 to the control switch 90 which is connected via the conductor 114, contact 138 and conductor 116 to the battery 42, as shown in FIGURE 1.

*Operation*

In operation, when the vehicle is travelling at the desired predetermined speed, the contact 18 on the end of the speedometer arm 12 will rest on the non-conducting portion 22 of the contactor ring 20 and the system will be inoperative as the movable contacts 50 and 52 will be in the open position.

When the speed of the vehicle increases, the pointer 12 will rotate about the pivot 14 and the contact 18 will be engaged with a portion of the contactor ring 20. Current will then flow from the battery 42 through the conductor 40 and the coil 36 of the relay 34, the conductor 30 to the ring 20 and through the contact 18 on the pointer 12 to ground. Thus, the coil 36 will be energized and the armature of the relay 34 will be moved to engage the movable contacts 50, 52 with the contacts 56, 60, respectively. Current will then flow from the battery 42 through the conductor 64, the contacts 52, 60 and the conductor 68, 70 to the contact 72. With the switch 90 in the open position, the relay 86 will not be energized and the contacts 72 and 80 will be engaged with the contacts 118 and 122. The current from the battery will flow through the contacts 72, 122, the conductor 132, the contacts 136, 146, and the conductor 158 to the reversible motor 162. The motor will turn the wheel 166 in a clockwise direction and tend to move the throttle linkage 174 to a position of deceleration. The current will return from the motor 162 via the conductor 160, contacts 148, 142, the conductor 130, the contacts 118, 80, the conductors 78, 74, and the contacts 56, 50 to the ground 62. As the motor 162 decelerates the vehicle, the pointer 12 will return the contact 18 to the non-conducting portion 22 of the ring 20 to maintain the predetermined speed.

If the speed of the car should decrease, the pointer 12 will rotate the contact 18 into engagement with the other portion of the ring 20 so that current will flow from the battery 42 through the conductor 40, the coil 38, the conductor 32, the ring 20 and contact 18 to ground. The coil 38 will be energized and cause the engagement of the contacts 50 and 52 with the contacts 54 and 58, respectively. Thus, current from the battery will flow through the conductor 64, the contacts 52, 58, the conductors 76, 78, the contacts 80, 118, the conductor 130, the contacts 142, 148, and the conductor 160 to the motor 162. With the current flowing in this direction, the motor 162 will rotate the wheel 166 in a counterclockwise direction which will tend to accelerate the vehicle by moving the throttle linkage 174. The current will return from the motor via the conductor 158, the contacts 146 and 136, the conductor 132, the contacts 122, 72, the conductors 70, 66, and the contacts 54, 50 to the ground 62. As the vehicle accelerates, the pointer 12 will rotate the contact 18 into the nonconducting portion 22 of the ring 20 and the current from the battery will again cease to flow so that the electrical connections through the movable contacts 50, 52 will be broken.

At any time during any cycle of events, the operator is able to increase or decrease the vehicle speed by actuation of the accelerator pedal 152 and the accelerator rod 150. In order to move the accelerator linkage and contactors 146, 148 from the normal controlled-driving position of contactor engagement, the spring 176 must be forced out of the indentation 178 by increasing or decreasing foot pressure of the vehicle operator on the accelerator pedal. If the operator decreases pressure on the pedal 152, the spring bias thereon will cause the accelerator rod 150 to be disengaged from the spring 176 and move the contactors 146 and 148 into engagement with the contact surfaces 134 and 140. At the same time, movement of the accelerator rod will cause a decelerating movement of the throttle linkage 174 to admit less fuel to the vehicle engine and reduce speed. When pressure is completely removed from the accelerator pedal the engine idle speed will be attained. The operator may increase the speed of the vehicle by depressing the pedal 152 and rod 150 so that the contactors 146 and 148 are moved into engagement with the contacts 138 and 144, and an acceleration movement is imparted to the throttle linkage 174. In this latter position, the electric motor 162 is operative because the contactors 146 and 148 are in engagement with the contacts 138 and 144, respectively; and current will flow from the battery 42 through the conductor 116, the contacts 138, 146, and the conductor 158 to the motor 162. Current returns from the motor 162 via the conductor 160 and the contacts 148, 144 to ground. This flow of current will cause the motor to drive the wheel 166 in a counterclockwise direction and cause a speed increasing movement of the throttle linkage.

Whenever it is desired to establish a new controlled speed, the vehicle operator will actuate the accelerator pedal to increase or decrease the vehicle speed as previously described. When the vehicle reaches the desired speed the operator will close the switch 90 by merely grasping the ring 104 and pulling it toward the horn ring 110. The movement of the ring 104 against the bias of the spring 108 will engage the contacts 102, 106 to allow current to flow from the battery 42, through the conductors 116, 114, 88, the relay 86 and then to ground at 92. When the relay 86 is energized, the armature 82 will move the contacts 80, 72 into engagement with the contacts 120 and 124, respectively. This will cause any current in the conductors 70 and 78 to flow via the conductors 126 and 128 to the reversible electric motor 28. As the car accelerates or decelerates, contact 18 will move from the non-conducting portion 22 to a conducting portion of the ring 20 and cause current to flow via the conductor 64, and the contact 52 in the manner hereinbefore described. The reversible electric motor 28 will rotate the disk 16 about the pivot joint 14 until the non-conducting portion 22 of the ring 20 is moved into position under contactor 18. As soon as the pointer 12 and disk 16 reach the new setting of controlled speed, the operator will release the ring 104 to open the switch 90 and will return the throttle rod to the normal controlled-driving position to re-establish control of the throttle linkage 174 by the reversible motor 162.

The spring 176 is so positioned that it will be engaged with the recess 178 on the accelerator rod 150 during engagement of the contactors 146, 148 with the contacts 136, 142 and, consequently, whenever the vehicle is being operated at a controlled speed. The action of the spring 176 necessitates the application of an additional force to override the speed control when increasing or decreasing vehicle speed and the change in force will enable the operator to be aware of all changes to and from the control position.

The operation of the embodiment shown in FIGURES 3 and 4 is the same as that shown in FIGURE 1, except for the speed selector means and the speedometer indicator. The cylinders 184 and 188 are rotatable in response to rotation of the speed sensitive magnet 182 and would normally both rotate to identical positions against the bias of their respective springs 186. However, the brake shoe 198 prevents the cylinder 188 from rotating. When a desired speed is reached the vehicle operator can excite the solenoid 202 and disengage the brake shoe 198 from the rotatable cylinder 188 by closing the switch 90. This will allow cylinder 188 to rotate in response to the magnet 182 and align the indicator arm 190 with the non-conducting portion 196. The operator will then open switch 90 to again engage the brake shoe 198 with the rotatable cylinder 188 so that the indicator arm 190 will engage the copper contactors 192 and 194 as the speed of the vehicle increases or decreases from the speed at which the brake shoe was engaged. The operation of the rest of the circuit is identical to that shown in FIGURE 1 as the engagement of the indicator arm 190 with the copper contactors will excite the relay 34 to cause current to flow to the accelerator controlling electric motor via the conductors 70, 78 and the contacts 136, 142.

It will be seen that a convenient means has been provided for controlling vehicle speed within predetermined limits and at exact speeds. The predetermined speed setting may be changed momentarily by the operator without removing his hands from the vehicle steering wheel. In fact, the simple movement of his forefinger will enable him to set any desired speed in the controlling mechanism. Although a preferred embodiment has been illustrated and described, it will be apparent that other electrical sensing means may be used in this system without departing from the spirit of this invention, and I intend that such equivalents are to be included within the scope of the appended claims.

What is claimed is:

1. In a motor vehicle having a speed indicating mechanism, a throttle valve, a throttle valve actuating accelerator control including an accelerator pedal and control linkage, steering mechanism including a steering wheel, and an electrical source; a speed control comprising first and second reversible electric motors, a first relay controlling energization of said motors, a switch device controlling energization of said first relay, said switch device operatively associated with the speed indicating mechanism, switch control means for opening said switch device to de-energize said first relay at a selectable vehicle speed and to close said switch device and energize said first relay at speeds above and below the selectable vehicle speeds, a plurality of switch devices operable by the accelerator pedal and control linkage, a second relay adapted to alternatively energize said motors, a manual switch controllably associated with said second relay, linkage mechanically connecting said first electric motor and said throttle valve linkage, said second electric motor provided with means to change the effective switch opening position of said switch control means to alternative selected speeds throughout the speed range of said speed indicating device, a pair of circuits including in series said electrical source, said first relay, said second relay, said plurality of switch devices operable by the accelerator pedal and control linkage, and said second reversible electric motor, one circuit being energized by the closing of the switch device controlling said first relay at speeds above the selected controlled speed to operate said second reversible electric motor to cause a speed reducing actuation of said throttle valve and the second circuit being energized by the closing of the switch device controlling said first relay at speeds below the selected controlled speed to reversely operate said second electric motor to cause a speed increasing actuation of said throttle valve through said linkage connecting the motor to the throttle valve control linkage.

2. The apparatus described in claim 1 wherein said manual switch includes a ring member mounted concentrically within said steering wheel and actuable to open and close said switch.

3. The apparatus described in claim 1 wherein said plurality of switch devices include electrical contactors mechanically linked with said accelerator control and movable thereby, a detent engageable with said control linkage at an intermediate point in the movement thereof to retard throttle valve actuation, and electrical contacts included in said circuits and positioned in the path of said contactors for engagement therewith at the point where said detent is engaged with said control linkage.

4. In a speed control apparatus for vehicles, a speedometer having a speed sensing means associated therewith, said speed sensing means connected to a first and a second control circuit, said first control circuit actuating a reversible motor means when the speed sensing device indicates that the vehicle is traveling at a speed below a predetermined speed whereby said motor means actuates a throttle valve to increase the speed of the vehicle, said second control circuit actuating said reversible motor means when the speed sensing device indicates that the vehicle is traveling at a speed above the predetermined speed whereby said motor means actuates the throttle valve to decrease the speed of the vehicle, said speed sensing device being adjustable by a second reversible motor means, a switching means having a manual control adjacent a steering wheel of said vehicle, and said switching means causing said second reversible motor to be engaged with said first and second control circuits to thereby adjust the speed sensing device to a speed corresponding to the vehicle speed when the switching means is actuated.

5. In a speed control apparatus for vehicles, a speed sensing device having a first and second rotating element, said first rotating element having a non-conducting and conducting surface and being rotated by a first reversible motor means to adjust the speed setting of the control apparatus, said second rotating element being rotated in response to vehicle speed, a contactor carried by said second element of the speed sensing device to thereby coact with the conducting surfaces on said first rotating element to alternately actuate a decelerating and an accelerating control circuit, said decelerating control circuit actuating a second reversible motor means to decrease the vehicle speed, said accelerating control circuit actuating said second reversible motor means to increase the vehicle speed, whereby said control circuits maintain the vehicle speed at a predetermined value, a switching means having a manual control adjacent a steering wheel of said vehicle, and said switching means causing said first reversible motor to be engaged with said accelerating and decelerating control circuits to thereby adjust the position of said second rotating member of said speed sensing device to provide a change in the speed setting of said speed control apparatus.

6. A vehicle speed control apparatus comprising an electrical source, a speed indicator having a rotatable cylinder responsive to magnetic forces varied in proportion to vehicle speed and a second rotatable cylinder coaxial with said first rotatable cylinder and equally responsive to said magnetic forces, a throttle valve operable between open and closed positions of acceleration and deceleration, an accelerator pedal associated with said valve at all positions, a reversible electric motor positively joined to said valve whereby said motor may be energized to positively open and close said valve, a pair of circuit controlling contacts associated with said speed indicator, a contactor carried by said speed indicator and adapted for alternate engagement with said circuit controlling contacts, a non-conducting element for disengaging said contactor and said circuit controlling contacts at a selectable position on said speed indicator, a first circuit connectable to said motor and energized by engagement of said contactor and one of said circuit controlling contacts to cause said motor to move said throttle valve toward the open position, and a second circuit connectable to said motor and energized by engagement of said contactor and the other of said circuit controlling contacts to cause said motor to move said throttle valve toward the closed position, means on said cylinders to energize said circuit at speeds above and below a selected controlled speed, and an adjusting device operatively associated with said second rotatable cylinder to vary the effective position of said energized means to alternatively selectable speeds throughout the speed indicating range.

7. In a vehicle having a steering wheel, a source of electricity, a throttle valve, throttle actuating linkage means connected to said valve; speed control apparatus comprising a speedometer having a movable indicator member, a contact carried by said member, a conducting surface adapted to engage said contact in the speed indicating range of said indicator member; means to disengage said contact and said conducting surface at predetermined positions in the speed indicating range, a first reversible electric motor connected to said contact disengaging means; a switch supported within finger reach of the steering wheel adapted to energize said first motor to automatically change the position of said contact disengaging means to a predetermined position; a first circuit energized by movement of said indicator member above a predetermined position in the speed indicating range; a second circuit energized by movement of said indicator member below said predetermined position; a second reversible electric motor mechanically connected with said throttle actuating linkage and electrically connected in said circuits to be operable in a throttle closing, speed reducing, direction by said first circuit and operable reversely in a throttle opening, speed increasing, direction by said second circuit; manual throttle control mechanism connected to said trottle actuating linkage and operable throughout the speed indicating range; and circuit breaking means common to said circuits and associated with said manual throttle control mechanism whereby movement of said manual control mechanism from a normal position in a first direction will connect the second motor means directly to said source of electricity and movement in a second direction will disengage the motor from both energizing circuits, said circuit breaking means comprising contactor members movably supported by said manual mechanism, a plurality of contacts common to said circuits and engageable by said contactor members, a detent mechanism including a spring member and a corresponding recess engageable therewith formed in said manual mechanism, and said spring member and said recess being so positioned as to be operative when said contacts and said contactors are engaged.

References Cited in the file of this patent

UNITED STATES PATENTS

| | | |
|---|---|---|
| 2,661,071 | Hoener | Dec. 1, 1953 |
| 2,822,881 | Treharne | Feb. 11, 1958 |
| 2,897,906 | Brueder | Aug. 4, 1959 |
| 2,911,077 | Carter | Nov. 3, 1959 |
| 2,916,100 | Teetor | Dec. 8, 1959 |

FOREIGN PATENTS

| | | |
|---|---|---|
| 494,174 | Great Britain | Oct. 21, 1938 |